United States Patent

[11] 3,562,448

[72] Inventor Carl J. May, Jr.
Holmdel, N.J.

[21] Appl. No. 738,924
[22] Filed June 21, 1968
[45] Patented Feb. 9, 1971
[73] Assignee Bell Telephone Laboratories, Incorporated
Murray Hill, Berkeley Heights, N.J.
a corporation of New York

[54] COMMON CONTROL DIGITAL ECHO SUPPRESSION
21 Claims, 8 Drawing Figs.

[52] U.S. Cl. .......... 179/170.6
[51] Int. Cl. .......... H04b 3/24
[50] Field of Search .......... 179/170.2, 170.6, 170.8

[56] References Cited

UNITED STATES PATENTS 3,305,646 2/1967 Brady et al. .......... 179/170.2X

*Primary Examiner*—Kathleen H. Claffy
*Assistant Examiner*—William A. Helvestine
*Attorneys*—R. J. Guenther and R. B. Ardis

ABSTRACT: A method of, and apparatus for, accomplishing signal controlled digital echo suppression for a plurality of two-way transmission circuits is disclosed. Analog signal levels on each line of each associated transmit-receive pair are digitized in the time slot allocated for that pair and applied to common time-shared logic which includes a time-divided memory. The common logic combines the digitized signal level information with code signals representing the past signal bearing statuses of the lines, and timing signals stored in the time-divided memory to determine if the respective present activity statuses of the pair are such that echo suppression is required.

INVENTOR
C. J. MAY, JR.
BY R. O. Nimtz
ATTORNEY

GRANULARITY PULSES

COMMON CONTROL DIGITAL ECHO SUPPRESSION

BACKGROUND OF THE INVENTION

1. Field of the Invention

This invention relates to the field of signal controlled communication systems and more particularly to digital echo suppression in two-way signal controlled communication systems using common time-shared control circuitry.

2. Description of the Prior Art

Echo suppressors are primarily signal controlled devices which insert a large impedance in the echo path of a two-way transmission connection while signals are being transmitted over the other path. In general, an echo suppressor detects the presence of a signal on the line over which information is being received and responds by activating a switching device that inserts an impedance in series with the line that represents the return path. Any echo signals propagated through the receiving terminal are dissipated by the impedance inserted in the return path before they can reach the transmitting terminal. The deactivation of the switching device, upon the occurrence of null in the received signal, is delayed a selected interval in order to accommodate signals of varying amplitude, such as speech. This delayed deactivation is provided to insure that the echo suppression impedance is not removed from the echo path when the received signal merely drops below the activation threshold temporarily.

In the prior art, each pair of lines is provided with a complete echo suppression circuit. That is, in a terminal having 25 pairs of lines connected to it, 25 complete echo suppression circuits would be required. Additionally, the echo suppression circuits themselves are basically analogue circuits. In other words, the circuits are designed to respond directly to the analogue signal level on the line and the timing is achieved by such means as R-C or L-C networks.

While this type of echo suppression provides satisfactory results, it becomes expensive where a large number of line pairs are involved since a complete echo suppressor circuit is required for each line pair. Additionally, in a signal controlled digital transmission system, the use of these circuits requires the design of special analogue circuits since the digital logic circuits of the system cannot be used. This increases both the development and maintenance cost of the digital system.

Signal controlled transmission systems using common time-shared digital circuitry are well known. An example of such a system is shown in F. A. Saal U.S. Pat. No. 3,030,447, issued Apr. 17, 1962. Additionally, my copending application Digital Speech Detection System, Ser. No. 626,055, and filed Mar. 27, 1967, is another example of such a system.

In a transmission system like either of the above, it is desirable to use digital echo suppression in order to capitalize on the economies realizable through the use of time-shared circuitry. That is, instead of providing a complete echo suppression circuit for each line pair in a two-way transmission system, it is sometimes more economical to digitize the analogue signal levels on a line pair and utilize the common time-shared circuitry of the system to accomplish echo suppression. In such a system, the signal levels on each line of the line pair are digitized each time the line pair is sampled and the digitized signals are introduced into common digital circuitry which controls the insertion of echo suppression. Every time a line pair is sampled, the common digital circuitry uses the resulting digitized signals to determine whether or not echo suppression is needed for the sampled pair.

SUMMARY OF THE INVENTION

Applicant has invented both a method of, and apparatus for, accomplishing digital echo suppression in a signal controlled transmission system using common time-shared digital circuitry. Generally, each line pair is repetitively sampled at a uniform rate in such a system. According to applicant's method, each time a line pair is sampled the analogue signal levels on each line are digitized. The information represented by the two sets of digitized values is then combined with selected digital signals that are a function of the digitized values obtained from past samples of the pair to determine if each line in the pair is active or idle. Echo suppression is activated when the statuses of the line pair satisfy the equation;

ES = LE(idle) LO(active) (1) where is indicates that echo suppression is activated, LE(idle) indicates that there is no signal on the even line, and LO(active) indicates that there is a signal on the odd line. In other words, when the transmitting or, alternatively, the even line signal level indicates that no information is being sent over that line, and the receiving or, alternatively, the odd line signal level indicates that there is information on that line, echo suppression will be activated by the common digital circuitry. Similarly, if the signal levels on a pair of lines for which echo suppression has been activated in the past take on values such that equation (1) is no longer satisfied, echo suppression will be deactivated.

It is an object of this invention to utilize digital techniques in providing echo suppression.

It is another object of this invention to capitalize on the economies realizable from time-sharing circuitry in accomplishing echo suppression in a signal controlled transmission system.

Yet another object of the invention is to utilize digitized amplitude levels of received and transmitted signals to determine when echo suppression is required in a two-way transmission system.

A more specific object of the invention is to control echo suppression by repetitively sampling signal levels on a transmit-receive line pair and comparing these levels with code signals which are a function of the signal level statistics.

Yet another specific object of the invention is to utilize digital techniques in conjunction with signal level statistics in implementing echo suppression in a signal controlled transmission system using common time-shared logic.

One of the advantages of applicant's invention is that it reduces the cost of providing echo suppression in signal controlled digital transmission systems using common time-shared logic. Another advantage is that the invention may be modified to accommodate different types of signals having different amplitude variation statistics without changing any circuit components. Yet another advantage is the ability to more precisely control the intervals during which echo suppression is activated thereby minimizing the time a transmit line may not be used due to the existence of unneeded echo suppression.

GENERAL DESCRIPTION OF THE INVENTION

Figure 6:
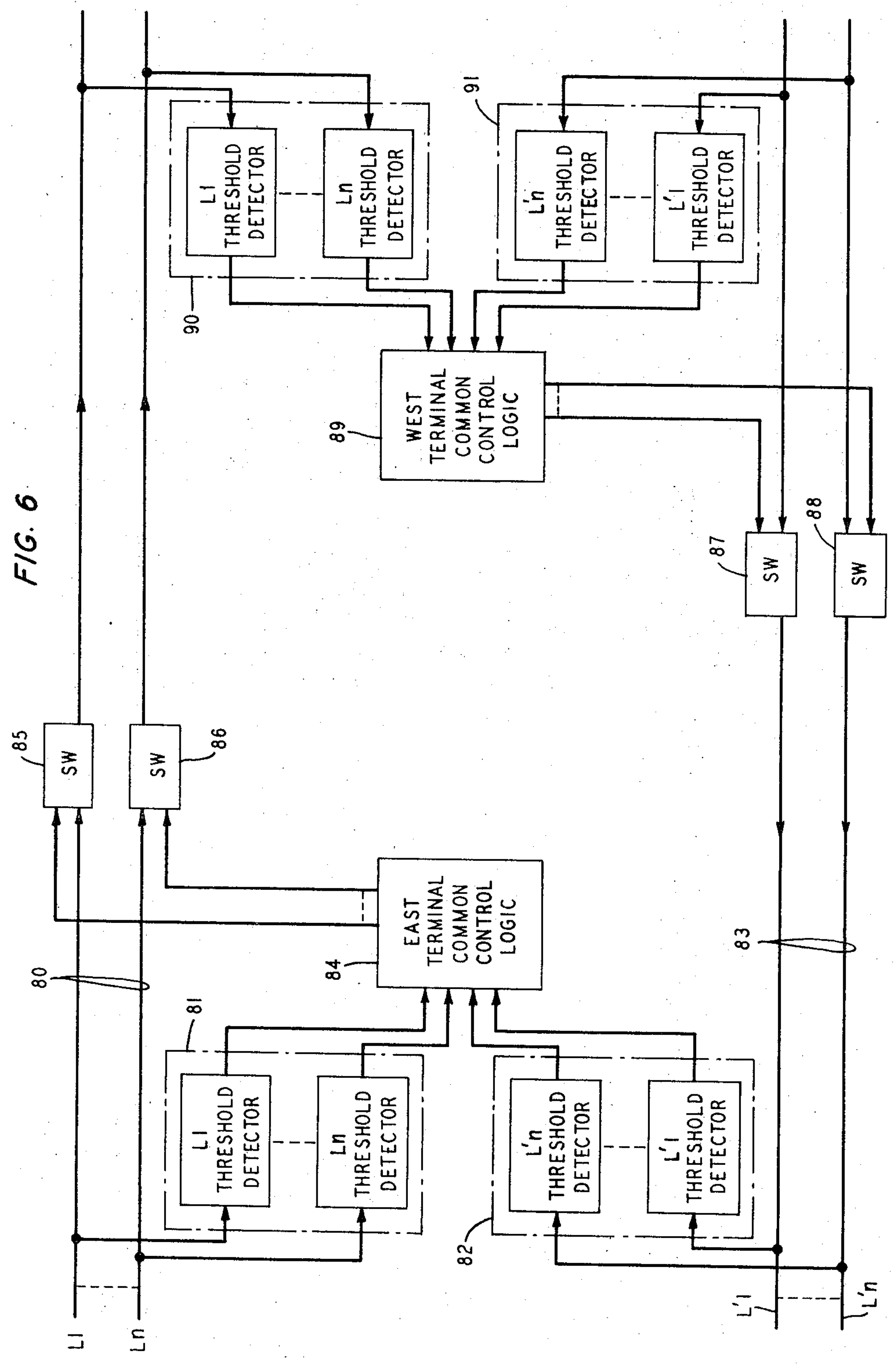
FIG. 6 shows a general functional block diagram of a two-terminal communication system incorporating applicant's invention.

FIG. 6 shows a general functional block diagram of a two-terminal communication system incorporating applicant's invention. Signals transmitted from the east terminal are sent over the lines L1 through L*n* and signals are received at that terminal over lines L'1 through L'*n*. The converse is true for transmitting and receiving signals at the west terminal.

At the east terminal, a plurality of threshold detectors 81 and 82 monitor the analogue signal levels on the transmitting lines 80 and the receiving lines 83, respectively. Each of the threshold detectors 81 is associated with a selected one of the threshold detectors 82. The various associated pairs of threshold detectors are sampled repetitively in the time slot allocated for the transmit-receive line pair they monitor.

For instance, the L1 and L'1 threshold detectors are sampled together in the time slot for the L1-L'1 line pair The L1 and L'1 detector outputs, which are digitized level signals representing the analogue signal levels present on the respective lines the detectors monitor, are simultaneously introduced into the east terminal common control logic 84. If the requirements of equation (1) are satisfied, the common control logic 84 generates a signal that enables switch 85 to activate echo suppression at the east terminal for the L1-L'1 line pair. If equation (1) is not satisfied, switch 85 will be disabled resulting in echo suppression being deactivated for the line pair. The function of switch 86 is analogous to that of switch 85 when lines L*n* and L'*n* are sampled. The foregoing operations will be repeated for each of the line pairs L1-L'1 through L*n*-L'*n* as each pair is sampled.

Simultaneously, the same operations described above occur at the west terminal which need not operate synchronously with the east terminal. The functions of the threshold detectors 90 and 91, the west terminal common control logic 89, and switches 87 and 88 are analogous to their respective counterparts in the east terminal. Echo suppression is also activated or deactivated at the west terminal in accordance with the requirements of equation (1) It will be noted that the west terminal differs from he east terminal only in the reversal of the lines considered as transmit and receive lines. In other words, east terminal transmit lines are considered as west terminal receive lines and east terminal receive lines are considered as west terminal transmit lines.

Figure 1:
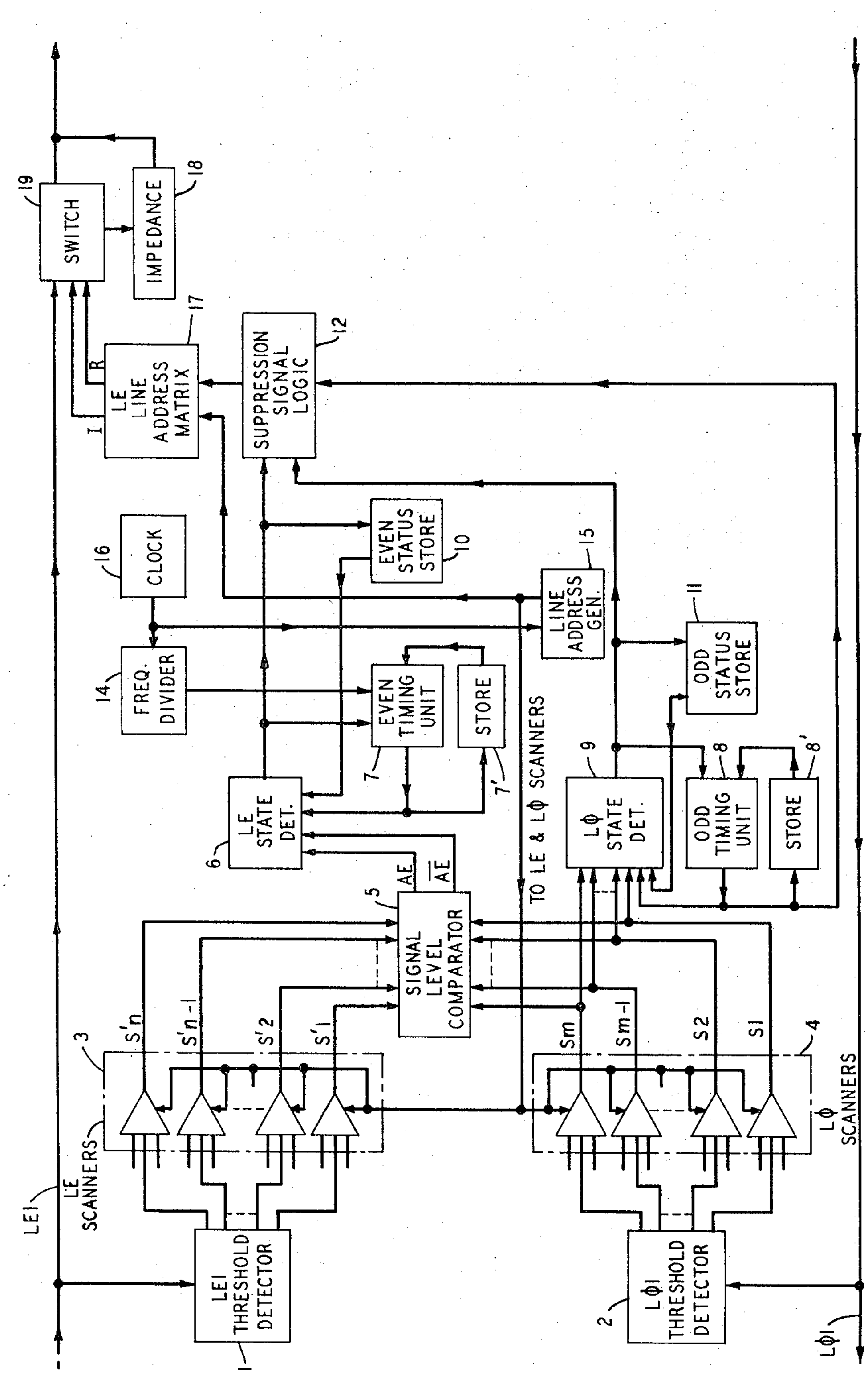
FIG. 1 is a functional block diagram of a system that provides digital echo suppression.
Figure 4B:
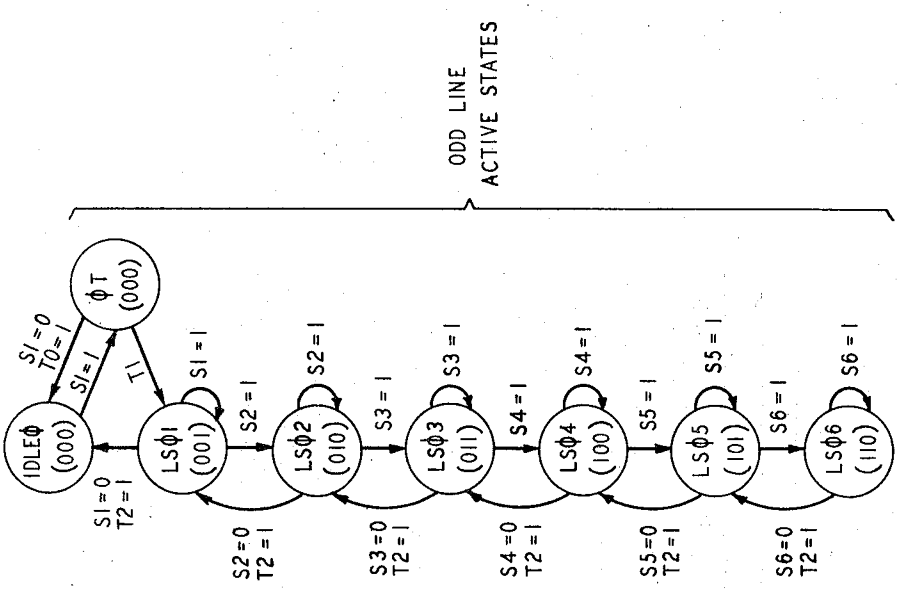
FIGS. 4A through 4C are state diagrams useful in describing the operation of the system shown in FIGS. 1 through 3.
Figure 4A:
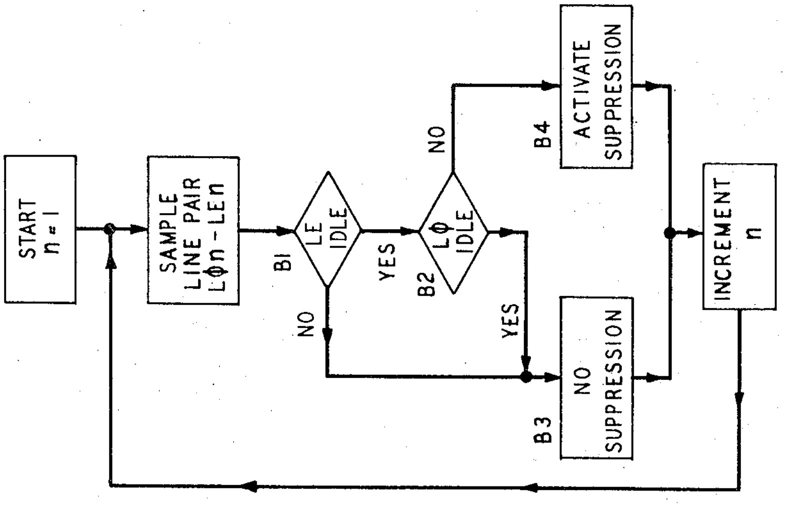
Figure 4C:
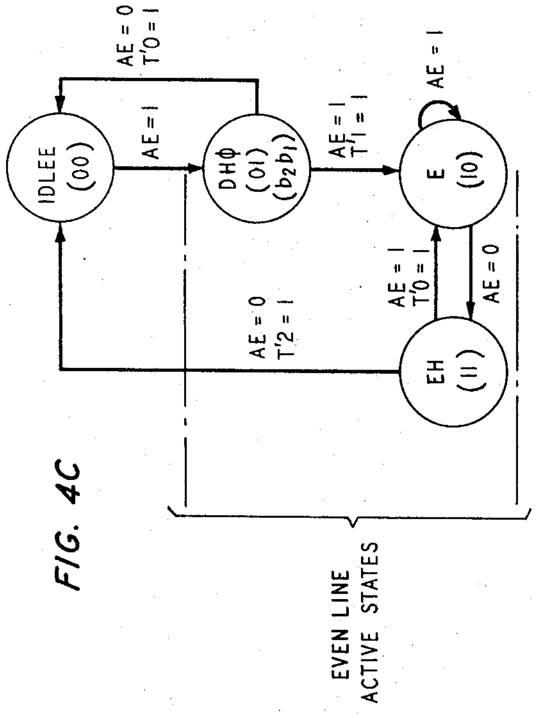

Applicant's invention is most readily understood, generally, when discussed in terms of the diagrams shown in FIGS. 4A through 4C. FIG. 4A is a general flow diagram representing the major steps in applicant's method. The operation of echo suppression is the same at both the east and the west terminals shown in FIG. 6. Consequently, a discussion of how echo suppression is accomplished at the east terminal sufficiently discloses applicant's invention and avoids the redundancy inherent in discussing echo suppression operation for both terminals. The symbols LE and LO are used in this FIG. to represent the even line and odd line in the line pair being sampled. For instance, when the pair LE1 and LO1 shown in FIG. 1 are sampled, the LE*n* and LO*n* in FIG. 4A represent these lines.

When a pair is sampled, the flow diagram in FIG. 4A indicates that the first step B1 taken is to determine if the even line LE is idle. That is, it is determined if line LE is being used to transmit information at the time of the sampling. If line LE is idle, then an impedance may be inserted in series with the line without interrupting a transmission of information. Assuming that line LE is idle, the next step B2 is to determine if line LO is idle. In this case, line LO is considered idle if no information is being received on the line. If line LO is idle, there is no need to activate echo suppression and insert an impedance in series with line LE since there is no incoming signal to generate an outgoing echo signal. However, if line LO is active, or not idle, this indicates that there are incoming signals on line LO and the possibility of an echo signal being generated exists. Recalling that line LE is assumed to be idle, line LO being active satisfies the conditions required by equation (1) above and echo suppression is activated.

It will be noted that if, during the first step B1 shown in FIG. 4A, it is determined that line LE is not idle, the next step B3 is to deactivate echo suppression. The indication that line LE is not idle means that the signals on it may not be attenuated without destroying information being transmitted. Consequently, where line LE is not idle no echo suppression is activated and if echo suppression is already activated, due to past samples of the line pair, it is deactivated.

After completing the foregoing steps for the first line pair, the next line pair is sampled and the steps are repeated again. This process will continue until each of the line pairs in an *n* system has been sampled and then the process will begin again with the first line pair sampled.

The methods of determining if line LO and line LE are idle are represented by the state diagrams shown in FIGS. 4B and 4C respectively. For instance, at the time lines LE1 and LO1 (FIG. 1) are sampled, one of the numerical codes in each of the FIGS. 4B and 4C will be available in the even status store 10 (FIG. 1) and the odd status store 11. These codes represent the past activity statuses of the respective liens and they are combined with the digitized level signals and other selected signals to alter each line status code in the manner shown in FIGS. 4B and 4C. It will be noted that there are a number of state codes provided for each line. These are used to provide the delayed activation or deactivation of echo suppression similar to that found in analogue echo suppression systems.

More specifically, assuming that both lines LE1 and LO1 (FIG. 1) have been idle a selected period of time when they are sampled, their statuses will be that of idle. These states are digitally represented by the codes "00" (FIG. 4C) and "000" (FIG. 4B) contained in selected locations of the time-divided status stores 10 and 11 (FIG. 1) respectively. If, at the tine of the sampling, there is still no signal on line LE1 (FIG. 1) and the signal level on line LO1 has increased to the point that it exceeds the level S1 (FIG. 4B), the status of line LO1 becomes OT and the status of line LE1 remains IDLEE (FIG. 4C).

The OT state (FIG. 4B) will be described as a nonidle state for line LO1 which is provided to minimize the time the line remains in the nonidle state if transition from IDLEO to OT was caused by noise. However, it is obvious that the OT state could be an idle state which required the input signal to exceed a certain level for a time T1 before an active state was assigned to line LO1. The latter operation would keep echo suppression from being activated until it was established that the signal giving rise to the OT state being assigned was, in all probability, not noise. The function of the OT state is optional.

In the instant case, where LE1 (FIG. 1) is idle and LO1 is active, equation (1) is satisfied and echo suppression will be activated. If the signal level on LO1 fails to exceed the S1 (FIG. 4B) level on every sample of that line after the original transition for an interval represented by TO, the status of line LO1 is again changed to IDLEO. When this occurs, equation (1) will no longer be satisfied and echo suppression will be deactivated. In other words, by providing the OT state for line LO1 and properly choosing the interval TO, the amount of time echo suppression is activated as a result of a burst of noise on line LO1 is minimized.

If, on the other hand, the signal on line LO1 was not noise and its amplitude continues to be greater than level S1 (FIG. 4B) on each sample of the line for a selected interval represented by T1, after entering the OT state, the status of line LO1 becomes LSO1. When this occurs, it may be assumed that the signal on line LO1 is an information bearing signal rather than noise.

It will be noted that FIG. 4B shows five nonidle states, LSO2 through LSO6, in addition to OT and LSO1. It is not mandatory that there be seven nonidle or, alternatively, active states. The number of such states is merely a rough indicator of the preciseness of the correlation between signal amplitude on the line and the application of echo suppression in accordance with the signal level statistics. The method would still be valid if there were only three nonidle states or if there were ten nonidle states. Six states were used in the illustrative example because this number of states represents a reasonably precise scheme.

After the LSO1 state (FIG. 4B) has been assigned to line LO1, it will remain the line's assigned state as long as the signal on line LO1 is of sufficient amplitude to exceed S1 but not sufficient to exceed level S2. However, if the signal amplitude on line LO1 decreases and does not exceed level S1 on any sample of the line for a selected interval, represented by T2, the state of line LO1 will be changed from LSO1 to the IDLEO state. In other words, if while line LO1 (FIG. 1) is assigned an active status such as LSO1, the signal drops and remains below the minimal S1 level for an interval equal to T2, it is assumed that LO1 is idle. When the LSO1 to IDLEO transition occurs, the echo suppression, which was activated while line LO1 was assigned the OT active state, will be deactivated since the signal on line LO1 is no longer of sufficient amplitude to produce echo signals. The delayed deactivation is provided to compensate for temporary nulls occurring in the signal amplitude being received on line LO1.

On the other hand, if line LO1 (FIG. 1) is assigned the LSO1 state and the succeeding sample indicates that its signal amplitude exceeds level S2, the state assigned to the line will be changed to LSO2 (FIG. 4B). Specifically, where the signal on line LO1 maintains an amplitude exceeding the level S6, the state assigned to line LO1 will be sequentially altered, on five successive samples of the line, until its assigned state becomes LSO6. As long as the line LO1 signal amplitude remains at a level exceeding level S6 the state assigned to line LO1 will remain LSO6 and this state assignment along with the IDLEE state assigned to line LE1 will result in echo suppression remaining activated.

When the signal on line LO1 decreases and no longer exceeds level S6 for a period equal to T2 (FIG. 4B), the state assignment for the line will become LSO5. As the signal level on line LO1 continues to remain below the level required to maintain the lines assigned state the assigned state will be altered at intervals equal to $T_2$ until the IDLEO state is reached. At this point, as was indicated above, it is assumed the signal on line LO1 is insufficient to generate echo signals and echo suppression is deactivated.

Essentially, FIG. 4B may be thought of as one way of implementing a probability distribution where the probability is a function of signal amplitude and signal duration. That is, when line LO1 has been idle and a signal of sufficient amplitude to generate echo signals appears on it, it is ultimately assigned one of seven active statuses. This status is determined by the amplitude and the duration of the signal present on the line.

The higher the signal amplitude and the greater its duration, the longer the state assigned to line LO1 will be active state after the signal on that line terminates. Conceptually, this is based on the fact that there is a high probability of high amplitude, long duration signals being information bearing signals which will continue to exist a significant length of time. Therefore, it would be inadvisable to deactivate echo suppression every time there was a decrease in the amplitude in one of the signals. On the other hand, by varying the amount of time a line remains active after the signal value on it decreases, as a function of the signal amplitude and duration, the amount of time echo suppression is activated when not needed is minimized. The upper and lower bounds of the time intervals involved are similar to those used in prior art echo suppression.

The above has shown how the activity status assigned to any odd line LO*n* in a two-way transmission system is determined on the basis of the signal amplitude present on that line during successive samples. While the discussion was in terms of only one odd line LO1 (FIG. 1), it is obvious that the same steps would be performed for each odd line in a system having *n* line pairs as each line pair is repetitively sampled.

As was noted earlier, the echo suppression is accomplished by inserting an impedance in series with the transmitting or, alternatively, even line which precludes any transmission over the line. Therefore, it is desirable to activate echo suppression only when there is no signal being transmitted on the even line and the signal on the odd line is of sufficient amplitude to generate echo signals. Consequently, in addition to determining the activity status of the odd line in the manner indicated in FIG. 4B, it is also necessary to determine if information is being transmitted on the associated even line. This determination is made by comparing the signal amplitude present on both lines LO*n* and LE*n* at the time they are concurrently sampled. If the signal amplitude on the even line is greater than the signal amplitude on the odd line, it is assumed that the information is being transmitted on the even line or, alternatively, it is active, and echo suppression should not be activated. This eliminates the possibility of interrupting a transmission as a result of spurious noise signals occurring on the odd line.

The method of insuring that a transmission on an even line is not interrupted due to spurious noise signals on its associated odd line is shown graphically in FIG. 4C. The state diagram shown there is also based on signal level statistics of the kind discussed above. The signal AE in FIG. 4C is an active signal generated when the signal amplitude on an even line is greater than the signal amplitude on its associated odd line. The generation of this signal is used as an indication that information is being transmitted over the even line and echo suppression should not be activated.

Referring to FIG. 4C, if the even line being sampled, such as line LE1 (FIG. 1), has been idle in the past and the signal amplitude on it rises to a level exceeding that on line LO1 (FIG. 1), AE is generated and the state assigned to the even line changes from IDLEE (FIG. 4C) to DHO. In other words, after the generation of the signal AE, the assigned status of line LE1 is no longer idle and the conditions required by equation (1) above are no longer true. Consequently, echo suppression cannot be activated, or if it is already activated it will be deactivated.

The purpose of the DHO state, or deferred hangover state, in FIG. 4C, is similar to that of the OT (FIG. 4B) state for the odd line described above. It insures that if the assigned state of line LE1 changes from idle to active as a result of a burst of noise, the time the resulting active state exists will be minimized. The reason for this is as follows: If conditions require echo suppression when the noise occurs on the line LE1 (FIG. 1), it is desirable to rapidly reactivate echo suppression in order to eliminate any echo signals being generated by signals being received on line LO1. By making the first active state assigned to an even line relatively short in duration, i.e., less than full hangover is provided in the DHO state, the adverse effects of the boise on echo suppression were minimized.

More specifically, the IDLEE status (FIG. 4C) assigned to the even line LE1 (FIG. 1) is replaced by the DHO state when the signal AE is generated. Physically, this is accomplished by replacing the code "00," representing the IDLEE state (FIG. 4C), stored in a selected location of the even status store 10 (FIG. 1) with the code "01" which represents the DHO state. If, after this change of state has occurred, AE is not generated on any sample of line LE1 for an interval whose expiration is represented by the generation of timing signal T'O, the state of line LE1 again becomes the IDLEE state. Thus, it is clear that the interval represented by T'O is the maximum time the state of line LE1 will remain active after the occurrence of a burst of noise.

On the other hand, if the signal on line LE1 is of such an amplitude that the signal AE is generated on every sample of the line for an interval whose expiration is represented by the timing signal T'O (FIG. 4C), the DHO code "01" in the even status store 10 (FIG. 1) is replaced by the E code "10." The E state (FIG. 4C) being assigned to line LE1 is taken as an indication that there is a high probability of the signal on line LE1 being an information bearing signal such as speech. Consequently, it is desirable to delay the activation of echo suppression for a selected interval upon the occurrence of a null in the line LE1 (FIG. 1) signal in order to avoid interfering with the signal being transmitted on the line. The duration of the selected interval is dependent upon the type of signal transmitted and the statistical characteristics of the signal. As mentioned above, these characteristics may be thought of as a probability distribution based on signal amplitude and duration.

The desired delay in echo suppression activation is achieved by providing a full hangover state for line LE1 when the signal level on it decreases. In other words, if during the time line LE1 is assigned the active state E, the signal level on it drops below the level on line LO1 and the signal AE is not generated for a sampling of the line pair, the state assigned to line LE1 is changed to the EH, or hangover state (FIG. 4C). This change is represented by replacing the code "10" (FIG. 4C) representing the E state, in the location allocated to line LE1 in the status store 10 (FIG. 1) with the code "11" representing EH, the hangover state.

The hangover state EH (FIG. 4C) is also an active state and as long as it is the assigned state of line LE1 echo suppression cannot be activated since the requirements of equation (1) are not satisfied. If the signal level on line LE1 increases sufficiently to generate the signal AE while the line's assigned status is EH, and the signal is generated for every sampling of the associated line pair for an interval whose expiration is represented by the generation of T'0, the assigned state of line LE1 will again become the E state.

Practically, this represents the situation where there is only a temporary null in the information signal being transmitted on line LE1. Thus, a temporary null in the information signal merely results in the assigned active state of the line temporarily changing from the E (FIG. 4C) state to the EH state. The line's assigned status again becomes the E state once the signal on the line returns to a level sufficient to generate the signal AE and remains there for a selected interval. As was indicated above, this hangover is provided to avoid the activation of echo suppression while an information signal is being transmitted on line LE1 as a result of a temporary decrease in the signal's amplitude.

On the other hand, if the signal level on line LE1 remains below that on line LO1, resulting in the signal AE not being generated for any sample of the LO-LE1 line pair during the interval whose expiration is represented by the generation of T'2, the IDLEE state will replace the EH state as the assigned state of line LE1. That is, if the signal level on line LE1 remains blow that on line LO1 for an interval represented by T'2, there is a high probability that information is no longer being transmitted on line LE1. Here again the duration of the interval represented T'2 depends on the type of signal being transmitted and its statistical amplitude characteristics. Once the state assigned to line LE1 is again the IDLEE state (FIG. 4C), echo suppression may be activated if line LO1 has an active state assigned to it since this combination of state assignments satisfies the requirements of equation (1).

The above discussion may be summarized as follows: Initially, it is determined whether or not information is being transmitted over the even line of an associated pair. If so, then echo suppression is not activated. However, if the even line is idle, the next step is to determine if information is being received on the odd line. If the odd line of the associated pair is idle, there is no need for echo supression and it is not activated. On the other hand, where the odd line is active and the even line is idle, the possibility of echo signals being generated exists. Consequently, as indicated in equation (1) above, echo suppression is activated when the odd line in a pair is active and the even line is idle. Conversely, when the even line becomes active, or the odd line becomes idle, echo suppression will not be activated or, if it is activated at this time, it will be deactivated after the expiration of a selected interval.

DETAILED DESCRIPTION OF THE SYSTEM

A system operating in the manner generally described above is shown in FIG. 1. While only one pair of lines LE1 and LO1 is shown, it is clear that the system is intended to service a plurality of line pairs. The operation of the system may be completely and clearly described, with a minimum of repetition, using only one pair of lines.

Referring to FIG. 1, it will be noted that the only circuits used on a per-trunk basis are the threshold detectors 1 and 2. The rest of the system is time shared by the totality of line pairs being serviced. In general, the scanners 3 and 4 operate synchronously insuring that when the signal level on a given even line, such as line LE1, is sampled, the signal level on its associated odd line, line LO1 in this case, is also sampled simultaneously.

The threshold detectors 1 and 2 (FIG. 1) are used to convert various amplitude levels present in an analogue signal into a plurality of discrete signals. For instance, FIG. shows the line LE1 threshold detector 1 having *n* output leads and the line LO1 threshold detector 2 having *m* output leads. In operation, the analogue signal on line LE1 is applied to the threshold detector 1 and if its amplitude exceeds the level *n* there will be a signal on each of the threshold detector's *n* output lines. If, however, the signal amplitude on line LE1 is less than level 1, there will be no signals on any of the detectors's output leads. In other words, there will be an output on each of the detectors' output lines representing an amplitude level less than the amplitude present on line Le1. The operation of the LO1 detector 2 is analogous to that of the LE1 detector except that the LO1 detector detects *m* levels instead of *n*.

Generally, the *nth* level (FIG. 1) for the even line will be greater than the *mth* level for the odd line since the signal amplitude of the even line being greater than the signal amplitude on its associated odd line is used to indicate that the even line is active. The number of levels detected by each of the threshold detectors 1 and 2 is not fixed. In fact, they will vary with the requirements of the system being used.

For purposes of discussion, assume that both lines LE1 and LO1 (FIG. 1) have been idle. Further assume that on the current sample, the signal level on line LE1 (FIG. 1) remains insufficient to result in an output on any other output lines of detector 1 and the signal level on line LO1 has risen and is sufficient to generate signals on all of the output lines of the LO1 detector 2. In other words, this is assuming that information of a high amplitude is being received on line LO1 and no information is being transmitted on line LE1. Referring to equation (1), this condition of line LE1 being idle and line LO1 being active satisfies the requirements for the activation of echo suppression. Without any loss of generality and for the sake of clarity it is further assumed that *m* eqals 6 and *n* equals 7. This assumption allows reference to the state diagrams in FIGS. 4B and 4C, as discussed above, when it will clarify the following explanation.

Since both lines have been idle prior to this sampling, the even status store 10 (FIG. 1) contains the code "00" (FIG. 4C) in the location allocated for the status code of line LE1 and the odd status store 11 (FIG. 1) contains the code "000" (FIG. 4B) in the location allocated for the status code of line LO1. Referring to FIGS. 4B and 4C, it will be seen that these are the codes indicatng that the odd and even lines have been idle. By using recirculating stores, such as acoustical delay lines, which are synchronized with the line sampling rate, it is insured that the status codes assigned to a specific even-odd line pair is always available at the time the pair is sampled. Two such delay lines are used to construct two bit even status store 10 (FIG. 1) and three delay lines are used for the three bit odd status store 11.

Returning to FIG. 1, there will be no signals on any of the output lines of the LE1 detector 1 at the time of sampling due to the low signal level on the line LE1 at this time. However, the signal level on line LO1 is sufficient to generate a signal on all of the output lines of the LO1 detector 2.

At the time of the sampling or, alternatively, in the time slot allocated for the line pair LE1-LO1 (FIG. 1), the output line of each of the detectors 1 and 2 are connected to the common control circuitry through the scanners 3 and 4. The outputs of both the detectors 1 and 2 are connected to a signal level comparator 5 which compares the digitized level signals resulting from the analogue signals on line LE1 with the digitized level signals resulting from the analogue signal on line LO1. If the comparison of the two sets of digitized level signals indicates that the analogue signal on line LE1 is greater than that on line LO1, a signal AE is generated by the comparator.

This signal AE is the same signal as the active signal AE discussed above in conjunction with the state diagram shown in FIG. 4C. However, since it has been assumed that the analogue signal amplitude on line LE1 is less than that on line LO1 for this sample, no AE signal will be generated for this comparison. Referring to FIG. 4C, this means that the IDLEE state represented by the code "00," stored in the location of the even status store 10 (FIG. 1) allocated for line LE1, will remain unchanged for this sample. In other words, line LE1 is still idle during this sample and its status code will remain "00" to correctly indicate this fact the next time the line is sampled.

It will be noted that, in addition to being connected to the comparator 5, the signals on the output lines of the LO1 detector 2 (FIG. 1) are also connected to the LO state detector 9. The LO state detector 9 also has timing signal inputs from the odd timing unit 8, and status code inputs from the odd status store 11. The purpose of the LO detector 9 is to determine the status code that is to be stored in the location of the odd status store 11 allocated for the line LO1 in accordance with the conditions set forth in FIG. 4B. Since the signal level on line LO1 is sufficient to generate signals on all of the output lines of the threshold detector 2, there will be a logical 1 on the LO1 detector 2 output line S1. This signal on line S1 represents the presence of the lowest analogue signal amplitude level detected on line LO1. Additionally, since this is the time slot allocated for the LE1-LO1 line pair, the idle status code "000" (FIG. 4B) assigned to line LO1 will be available from the synchronous memory used as the odd status store 11.

The application of these signals to the LO state detector 9 does not result in the code"000,"in the odd status store 11, being changed. However, their application does result in the LO timing unit 8 being activated. The LO timing unit 8 contains a five bit synchronous memory 8' similar to the one used as the odd status store 11. Consequently, at the time a given line pair is sampled, the contents of the location allocated to the odd line in the timing unit store 8' is available and may be altered.

Where S1 = 1 (FIG. 1) and the status code assigned to line LO1 is the idle code "000" (FIG. 4B), the timing unit 8 (FIG. 1) increments the contents of the timing unit store allocated to line LO1. The above condition is represented in the state diagram by the signal combination (000) and S1 = 1 shown in FIG. 4B. When the assigned state of line LO1 (FIG. 1) is "000" (FIG. 4B) and the signal on line S1 is a 1, the assigned state of the line becomes the OT state (FIG. 4B) as a result of the timing unit 8 (FIG. 1) being enabled and incrementing the line LO1 timing code in the store 8'. It will be recalled that the OT state (FIG. 4B) is provided to minimize the time line LO1 is assigned an active status if this assignment results from a burst of noise.

Returning to FIG. 1, the presence of idle code "00" (FIG. 4C) in the even status store 10 location allocated for line LE1 along with the presence of "000" in the LO1 location of the odd status store 11 and the timing code for LO1 being such that TO = 0 results in the suppression signal logic 12 generating a signal. This signal, along with the address of the LO1-LE1 line pair, contained in the address generator 15, is applied to the address matrix 17 which, in turn, generates the signal I. The signal generated by the address matrix 17 operates a switch 19 to insert an impedance 18 in series with the line LE1. In other words, the generation of the signal I results in echo suppression being activated for the line LE1.

The above has shown how, beginning with both lines LE1 and LO1 assigned idle statuses and no echo suppression activated, the signal level on line LO1 increasing in amplitude sufficiently, while the line LE1 remains inactive, results in line LO1 being assigned an active status OT (FIG. 4B) and echo suppression being activated. Echo suppression will remain activated as long as the state assigned to line LO1 is an active state and line LE1 remains idle or nonactive.

As the LE1-LO1 pair is repetitively sampled at a fixed rate, and the analogue signal levels on the line remain as originally assumed, the timing code for line LO1 stored in the LO timing unit store 8' (FIG. 1) will be incremented each sample. When the stored LO1 timing code has been incremented to the point that it is equal to a selected code (FIG. 4B), it is assumed that the signals on line LO1 are information rather than noise. This condition is indicated by (FIG. 1), signal T1 being generated by the timing unit 8. 000" shown 000" 001" stored signal. OT line (FIG. 1), the combination of the signal on line S1 G -), with the timing signal T1 (FIG. 4B) and the stored status code "000" (FIG. 4B) results in the LO state detector 9 generating a signal that results in the line LO1 status code stored in the odd status sore 11 being changed. This is graphically represented in FIG. 4B where it is shown that the stored status code assigned to the line LO1 (FIG. 1) is changed from "000" to "001" when the signal on line S1 (FIG. 1) is a 1 aNd the stored timing code for the line is T1. In essence, this merely represents the observation that if the signal level on line LO1 remains high enough to generate a 1 signal on line S1 every sample of the line for an interval represented by the generation T1, the signal on the line is in all probability an information-bearing signal. Consequently, the tentative active status OT (FIG. 4B), initially assigned to line LO1, is changed to the full-fledged active status LSO1.

As the line pair continues to be sampled and the analogue signal level on line LO1 remains high enough to generate a 1 on lines S1 through S*m* (FIG. 1), the line's active status code will be changed by the LO state detector 9 (FIG. 1) each sampling until the status code for LSO6 (FIG. 4B) is stored in the location of the status store 11 allocated for the line. In other words, given the assumed signal levels on the LE1-LO1 pair, the status code for LSO6 would be assigned to line LO1 on the fifth sample of the line pair after line LO1 was initially assigned the LSO1 state. As was mentioned above, a number of active states are used to achieve operation closely correlated to the signal level statistics.

The stored status code assigned to line L01 will remain "110," which represents the LSO6 state (FIG. 4B), until the signal level on the line decreases. At this point, line LE1 is idle, line LO1 has a high amplitude signal on it and echo suppression is activated. Echo suppression will remain activated until one of two things occurs. That is, until either the signal level on line LO1 (FIG. 1) decreases to a level insufficient to generate signals on any of the lines S1 through S*m* and remains there a selected interval; or until the signal level on line LE1 increases to a level exceeding the line LO1 signal level. The former occurrence merely results in both lines being assigned an idle status. This condition does not satisfy equation (1) and echo suppression is deactivated accordingly. In other words, if signals on line LO1 are insufficient to produce echo signals, there is no need for echo suppression. The latter occurrence is defined as line LE1 becoming active and when this occurs equation (1) again is no longer satisfied. Consequently, echo suppression will be deactivated, allowing the signals on line LE1 to be transmitted.

Considering the case where the signal level on line LO1 drops below the level required to produce signals on any of the lines S1 through S*m* in FIG. 1, the operation of the system is as follows: Each time the LE1 and LO1 line pair are saMpled there will be no signals on the outpt lines of either of the threshold detectors 1 and 2 (FIG. 1). Since line LE1 already has an idle status code assigned to it, this will have no effect on its assigned status. However, it will be recalled that the status code assigned to line LO1 is the active LSO6 state (FIG. 4B) which resulted from the relatively long duration high level signal the line had on it prior to the decrease in signal level. Consequently, the absence of signals on lines S1 through S*m* (FIG. 1) will have an effect on the assigned status of line LO1. In other words the absence of signals on lines S1 through S*m* for a long enough period indicates that the line LO1 is no longer active and results in the line's status assignment being changed to the idle status code IDLEO (FIG. 4B).

More specifically, during the sequential alteration of the assigned status of line LO1 from LSO1 to LSO6 (FIG. 4B), as described above, the odd timing unit 8 was not active. However, the odd timing unit 8 is activated on the first sample of line LO1 that fails to produce a signal indicating that the signal level on the line exceeds the level S6 (FIG. 4B). In this case, where it is assumed $m$ equals 6, an absence of a 1 on line S$m$ (FIG. 1) would activate the timing unit 8. Where the assigned state of line LO1 is the LSO6 state (FIG. 4B), each sample of the line pair that fails to produce a signal on the line S$m$ results in the location allocated for the line LO1 timing code in timing unit store 8′ (FIG. 1) having its contents arithmetically altered.

This alteration of the line LO1 timing code will continue as succeeding samples of the line fail to generate a signal on line S$m$. After a selected number of samples, the stored timing code for the line equals a preselected value. The existence of this value results in the timing unit 8 (FIG. 1) generating the signal T2 (FIG. 4B). When this occurs, the LSO6 active state assigned to line LO1, and stored in the odd status store 11 (FIG. 1), will be altered by the state detector 9 responding to the application of the LSO6 and T2 signals. Referring to FIG. 4B, when the signal on line LO1 has been below level S6 for an interval represented by T2, the LSO6 status assigned to the line is replaced by the LSO5 status. When this replacement occurs the location in the timing unit store 8′ allocated for the line L01 is cleared.

As continued sampling of the line LO1 fails to produce any signal on lines S1 through S$m$ (FIG. 1), the above process will be repeated except that in this case, the LSO5 state (FIG. 4B) assigned to the line will be replaced by the LSO4 state when T2 occurs. After the signal on line LO1 has failed to generate any signals on lines S1 through S$m$ for a sufficient number of samples, its assigned state will be the LSO1 state (FIG. 4B) and the timing unit 8 (FIG. 1) will again generate the timing signal T2. This results in the LSO1 status code in the line's allocated location in the odd status store 11 being replaced with the IDLEO status code (FIG. 4B).

The simultaneous existence of the IDLEO state (FIG. 4B) as the assigned status of line LO1, and the IDLEE state (FIG. 4C) as their assigned state of line LE1 will not enable the suppression signal logic 12 (FIG. 1). Consequently, the suppression signal logic 12 will not generate a signal when the line pair is sampled. As a result, the signal R is generated by the line address matrix 17 which operates switch 19 and removes the impedance 18 from the line LE1 transmission path.

Since both members of the line pair are idle, the requirements of equation (1) are no longer satisfied and echo suppression is therefore deactivated. In other words, when the assigned status of line LO1 becomes the IDLEO state, this indicates that the signal level on that line is of insufficient amplitude to produce echo signals and echo suppression is deactivated.

The above has shown, generally, how the system of FIG. 1 operates in accordance with the state diagram shown in FIG. 4B. It was first shown that when line LO1 had a sufficiently high signal level on it and line LE1 was idle, the line LO1 had various active status codes assigned to it as indicated in FIG. 4B. These various active status codes assigned to line LO1, in conjunction with the idle status code assigned to line LE1, resulted in the impedance 18 (FIG. 1) being inserted in series with the line LE1 to suppress echo signals. Secondly, it was shown that when the signal level on line LO1 dropped below a selected level, its assigned active status was sequentially varied, as a function of time and amplitude, until its assigned state was again the idle state. When the assigned status of the line LO1 became the IDLEO state (FIG. 4B) again, the impedance 18 (FIG. 1) was removed from the line LE1 transmission path since echo suppression was no longer needed.

As pointed out in the discussion of FIG. 4C, the activity status assigned to line LE1 also varies as the signal amplitude on line LE1 varies. In the discussion of the operation of the system in FIG. 1, describing how it varied the activity status assigned to line LO1, it was assumed that line LE1 was idle. Therefore, its assigned status was the IDLEE state (FIG. 4C). However, if the signal level on line LE1 rises to a level exceeding the signal level on line LO1, line LE1 will be considered active at the time the line pair is sampled. When this occurs, the conditions of equation (1) are no longer satisfied and echo suppression cannot be activated during the time line LE1 remains active, or it is deactivated if it has been previously activated. In other words, line LE1 being active means information is being transmitted on it and this information must not be blocked by the insertion of an impedance in its transmission path.

Referring to FIG. 1, the activity status of line LE1 is determined by comparing the signal amplitude on it with the signal amplitude on line LO1 by means of comparator 5 each time the line pair is sampled. If the signal level on line LE1 exceeds the signal level on line LO1, indicating that line LE1 is active, the comparator 5 generates a signal AE that is applied to the LE state detector 6.

At the same time the signal AE is applied to the LE state detector 6 the past status code, which is assumed to be the IDLEE code "00" (FIG. 4C), is available from the even status store 10 (FIG. 1) and this code is also applied to the LE state detector 6. The even status store 10 is a recirculating store of the same type as the odd status store 11 discussed above, the only difference being that it is a two-bit store instead of a three-bit store. It also recirculates the synchronism with the scanners 3 and 4 so that each time the line pair is sampled, the assigned status of the line LE1 is available.

The concurrent existence of the signal AE and "00" assigned status code of line LE1 as inputs to the state detector 6 results in a new status code being stored in the location of the even status store 10 allocated for line LE1. Referring to FIG. 4C, the condition AE. (00) is the condition resulting in the status of line LE1 becoming DHO. Thus, the LE state detector 6 responds to the condition AE.(00) by replacing the "00" in the even status store 10 with the code "01." Consequently, the next time the line pair is sampled, the status of the line LE1 will be the DHO state (FIG. 4C) represented by the code "01" in the appropriate location of the even status store 10. It should be noted that the DHO state being assigned to the line LE1 indicates the line is active and hence, no echo suppression can be activated at this time.

The function of the DHO status (FIG. 4C) is similar to that of the OT state (FIG. 4B) provided for the odd line. That is, it is possible that a burst of noise was the source of the high amplitude on line LE1 when it was sampled. If this is the case, it is desirable to minimize the amount of time line LE1 remains active. As was explained in the discussion of FIG. 4C above, the presence of an incoming signal on line L01 may warrant the activation of echo suppression but the active status assigned to line LE1 prevents this activation. Thus, a burst of noise can result in line LE1 being assigned an active status which deactivates echo suppression and allows echo signals to be transmitted on the line. By minimizing the time line LE1 is assigned an active status as a result of noise, the amount of time echo signals are transmitted is also reduced.

If the active status DHO (FIG. 4C) is assigned to line LE1 as a result of noise, succeeding samples of the line will fail to generate the signal AE repetitively. Referring to FIG. 4C, the active status DHO will be changed back to the IDLEE state if the signal amplitude on line LE1 drops and remains below a level sufficient to produce the signal AE for any sample of the line pair over a period represented by the signal T′O (FIG. 4C).

Timing is accomplished by the LE timing unit 7 in FIG. 1. When the DHO state (FIG. 4C) is assigned to line LE1 (FIG. 1) as a result of the generation of the signal AE, the timing unit 7 is enabled. It will arithmetically alter the contents of a timing store 7′ location assigned to line LE1 on every sample of the line that fails to produce the signal AE. For instance, the timing store location allocated to line LE1 may be decremented for every such sample. When the code contained in the line LE1 location of the timing store 7′ (FIG. 1) reaches a preselected value represented by T′0 (FIG. 4C), indicating that the prescribed interval has passed without AE being generated again, the T′0 timing signal will be applied to the LE state detector 6 (FIG. 1). The condition AE=0, indicating the signal AE is not present, is also logically implied by the signal $\overline{AE}$ which is the inverse of AE being a 1.

At the same time, the status code "01" (FIG. 4C) assigned to line LE1 will also be applied to the state detector 6. This condition, $\overline{AE}$·DHO·T'O (FIG. 4C), activates the state detector 6 resulting in the timing unit storage location assigned to line LE1 being cleared and the assigned status code in the status store 10 being changed to "00."

In this manner, the assigned status of the line, which was changed to the active status DHO as a result of noise, becomes the IDLEE state again after the noise has subsided and the signal AE is not generated on any sample of the line LE1 for the interval represented by T'O (FIg. 4C). Here, as in the case of the OT state (FIG. 4B) for the odd line, the interval represented by the signal T'0 is a function of the amplitude statistics of the signal being dealt with. Again, the state diagram in FIG. 4C, in essence, represents the various responses of a system whose operation is based on the amplitude statistics of the signals on the input lines.

If the signal level on line LE1 represents information, it will remain high enough to generate the signal AE on every sample of the line LE1 for an interval represented by the timing signal T'1 (FIG. 4C). Referring to FIG. 1, as has been noted, during the time the DHO state (FIG. 4C) is assigned to the line LE1, the LE timing unit 7 is activated. In the case where the signal AE is being generated, the timing store 7' location allocated for the line LE1 may be incremented for every sample of the line that produces the signal AE. As the signal AE continues to be generated from sample to sample of the line LE1, the line's timing code will reach a selected value represented by the signal T'1. When this occurs, the timing unit 7 will generate the timing signal T'1 and the assigned status DHO (FIG. 4C) will be available in the even status store 10. These signals are applied to the LE state detector 6 which responds by clearing the location in the timing store 7' assigned to line LE1 and changing the assigned status code in the lines allocated slot of the even status store 10 to "10" (FIG. 4C). In other words, the assigned status of line LE1 is changed from DHO to E.

Referring to FIG. 4C, the presence of the code "10" in the even status store 10 (FIG. 1) slot allocated to line LE1 indicates that the signals on the line are in all probability information bearing signals. Consequently, the assigned state E (FIG. 4C), represented by the code "10," is considered the fully active state of the line LE1. This will remain the assigned state of the line until the signal level on it drops below a level sufficient to produce the signal AE.

As mentioned above, information bearing signals fluctuate in amplitude and it is desirable to avoid activating echo suppression when a temporary null in the signals on line LE1 occur. The hangover state EH (FIG.4C) is provided to avoid this problem. When the null in the signal level on the line LE1 is such that the signal AE (FIG. 1) is not generated by the comparator 5 for a sample of the line pair, the assigned state of line LE1 becomes the EH hangover state (FIG. 4C). Referring to FIG. 1, the signal $\overline{AE}$=1 and the E state code "10" (FIG. 4C), available from the even status stoe 10 at the time line LE1 is sampled, are applied to the LE state detector 6 which in turn replaces the "10" code in the status store 10 (FIG. 1) with the code "11." This represents the transition from the E state to the EH hangover state in FIG. 4C.

If the signal amplitude on the line LE1 returns to a level sufficient to generate the signal AE again, before the interval represented by T'2 (FIG. 4C) expires, and remains at this level for an interval represented by T'0, the assigned status of the line becomes the E state again. In other words, during the time the line LE1 (FIG. 1) has the EH state (FIG. 4C) assigned to it, the LE timing unit 7 (FIG. 1) is enabled and the location of the timing store 7' allocated for the line is arithmetically altered every time the line is sampled. When the line pair is sampled and the timing code for a line LE1 is a selected value, the signal T'0 (FIG. 4C) is generated by the timing unit 7. This signal along with the EH code signals "11" (FIG. 4C), which are available in the even status store 10 (FIG. 1), are applied to the LE state detector 6. The condition AE T'0 (11) (FIG. 4C) results in an output from the state detector 6 which alters the "11" code in the even status store 10 location allocated for the line LE1 to "10." That is, the assigned state of the line LE1 is changed from the EH state back to the E state.

By providing the hangover state EH (FIG. 4C), which is an active state, it is insured that a transmission on the line LE1 is not interrupted as a result of a temporary null in the information signal on the line activating echo suppression.

On the other hand, if the signal level on the line LE1 drops, and remains at a level insufficient to generate the signal AE (FIG. 1) for an interval represented by a timing signal T'2 (FIG. 4C), the IDLEE state replaces the EH state as the assigned state of the line. As indicated above, the timing unit 7 (FIG. 1) is activated during the EH state. The storage location of the timing store 7' allocated for line LE1 will be arithmetically altered for each sample of the line that fails to generate the signal AE. This will continue until the line LE1 timing code in the timing store 7' (FIG. 1) reaches a selected value representing the expiration of a selected interval. When this value is reached, the timing unit 7 will generate the signal T'2 (FIG. 4C). This timing signal is applied to the state detector 6 (FIG. 1). At the same time, the EH state code (11) (FIG. 4C) for the line is available from the even status store 10 (FIG. 1) and it is also applied to the LE state detector 6.

The combination of signals $\overline{AE}$·T'2·(11) (FIG. 4C) results in the state detector 6 generating signals which replace the "11" code in the even status store 10 (FIG. 1) location assigned to line LE1 with the "00" code. As indicated above, this results in the assigned status of the line LE1 being changed from the active hangover state EH (FIG. 4C) to the idle state IDLEE. In other words, the signal level on line LE1 remaining below a level sufficient to produce the signal AE for an interval represented by T'2 (FIG. 4C) is used as an indication that information is no longer being transmitted on the line. Consequently, the IDLEE state (FIG. 4C) is assigned to the line indicating that the line is idle. This condition allows the activation of echo suppression, via the suppression signal logic 12, if the signal level on the line LO1 has resulted in its being assigned an active state.

The above discussion has shown how the system in FIG. 1 operates in accordance with equation (1), and the state diagrams shown in FIGS. 4B and 4C, to provide echo suppression for the LE1-LO1 line pair. Digitized values of the analogue signal levels present on each line of the LE1-LO1 line pair are repetitively sampled. The digitized values derived from sampling the line LO1 are applied to the LO state detector 9 (FIG. 1) along with code signals from the odd status store 11, representing the line's past assigned status, and in some cases, timing signals generated by the LO timing unit 8. The state detector 9 responds to these signals according to the state diagram shown in FIG. 4C, changing the assigned status of the line LO1 stored in an allocated slot of the odd status store 11 as indicated.

Simultaneously, the digitized values derived from sampling the line LE1 and line LO1 are applied to a comparator 5 which generates a signal AE if the signal level on the line LE1 is greater than that on the line LO1. The signals AE and $\overline{AE}$ are used to indicate that either information is being transmitted on the line LE1 or the line is idle, respectively. These signals along with the assigned status code of the line LE1, available from the even status store 10 at the time of sampling, and in some cases, timing signals generated by the even timing unit 7 are applied to the LE state detector 6. This state detector responds to the signals according to the state diagram shown in FIG. 4C, changing the line LE1 status code contained in an allocated slot of the even status store 10 accordingly.

One additional operation occurs simultaneously with those discussed above. As was mentioned, when the LE1-LO1 line pair is sampled, the status code of each line is available in its respective status store. These codes, in addition to being applied to their respective state detectors, are also applied to the suppression signal logic 12 (FIG. 1) along with a selected timing signal output from the odd timing unit. If the assigned status of the line LE1 is an idle status and the assigned status of the line LO1 is an active status, the conditions required by equation (1) for activating echo suppression are satisfied and a signal is generated.

The signal generated by the suppression signal logic 12 is applied to a line address matrix 17 along with signals from the line address generator 15 which indicate the line pair being sampled at this time. These inputs result in the address matrix generating a signal I that operates a switch 19. When operated, the switch 19 inserts the impedance 18 in series with the line LE1 and any signals on that line are suppressed. Conversely, if the assigned status code on the line LE1 is an active status, the address matrix will generate a signal R which results in the impedance 18 being removed from the line LE1 transmission path. Similarly, the line LO1 being idle also results in the signal R being generated. In other words, the line LE1 having an active status assigned to it, or the line LO1 having the idle state assigned to it, results in echo suppression being deactivated.

Figure 2:
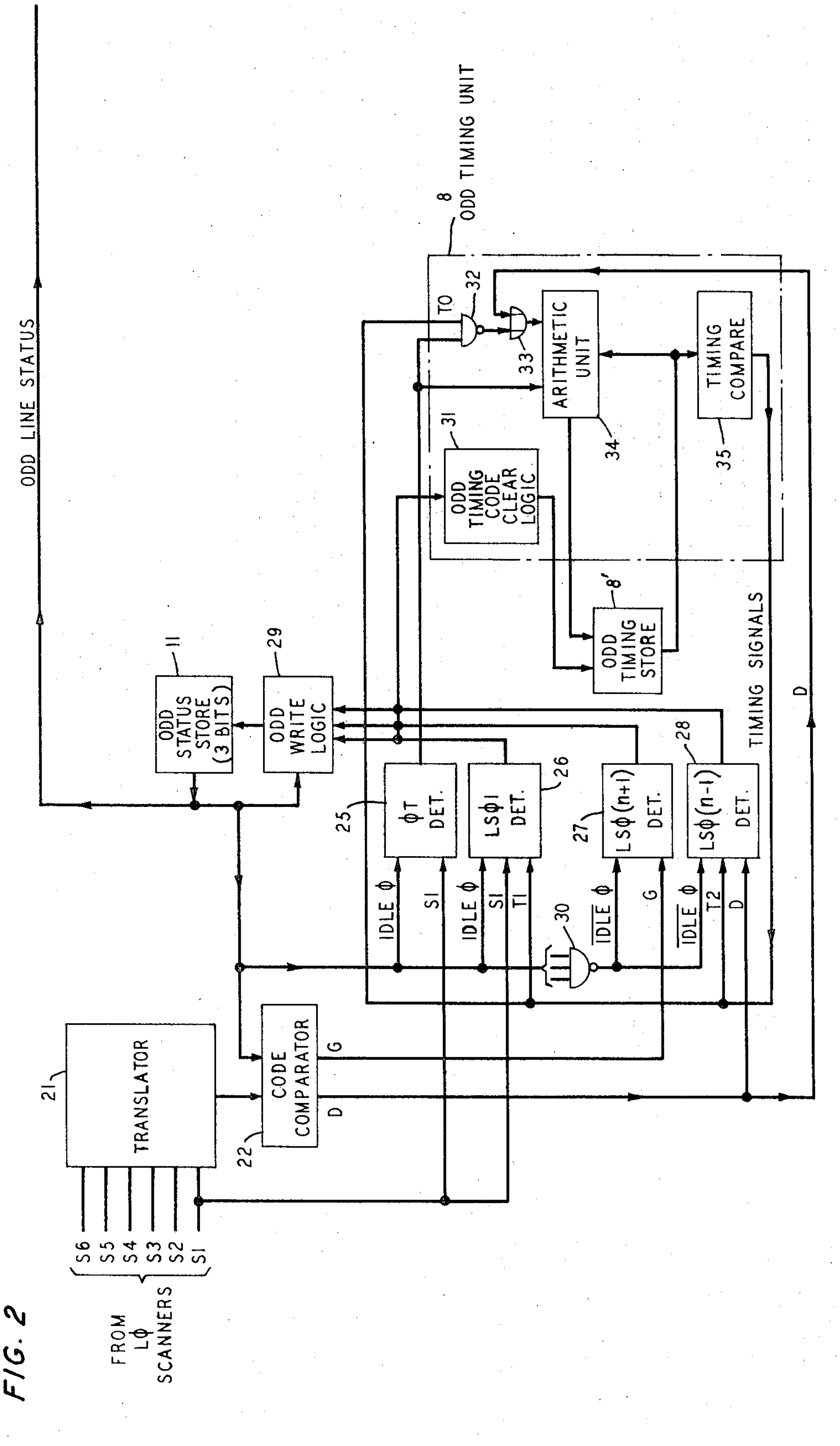
FIGS. 2 and 3 provide a more detailed functional block diagram of the system shown in FIG. 1.
Figure 3:
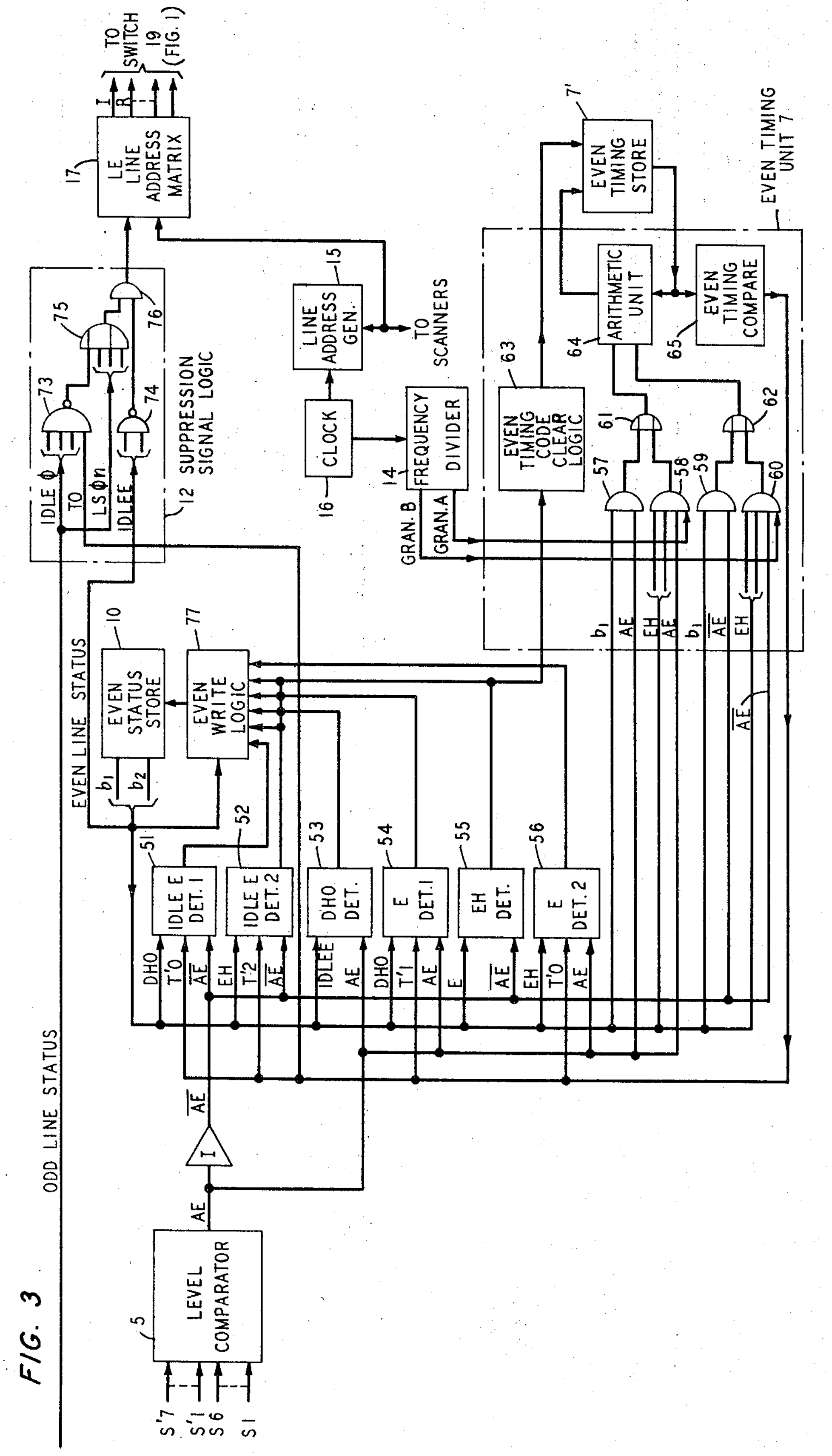

A more detailed understanding of the operation of various of the system's common time-shared components may be acquired by considering FIGS. 2 and 3 in conjunction with the following discussion. FIG. 2 shows a detailed functional block diagram of the logic used in determining the status to be assigned to the line LO1. The lines S1 through S6, carrying digitized level signals from the scanners 4 (FIG. 1), are connected to a translator 21 (FIG. 2).

The translator 21 converts the digitized level signals applied to it into the same code system as the binary codes shown in FIG. 4B. More specifically, if the signal level on the line LO1 (FIG. 1) is such that none of the lines S1 through S6 (FIG. 2) have a 1 on them the output of the translator will be "000" (FIG. 4B). On the other hand, if the lines S1 through S3 all have 1's on them as a result of the signal level present on line LO1, the translator 21 output will be "011" (FIG. 4B). Similarly, if all of the lines S1 through S6 have 1's on them, the translator output will be "110." In other words the translator 21 (FIG. 2) translates the digitized signal levels obtained from sampling the line LO1 into the same code system as is used to represent the assigned status of the line.

The translated level signals are then compared with the assigned status code of line LO1 which is available in the odd status store 11 (FIG. 2) at the time the line is sampled. This operation is performed by the code comparator 22 which may respond by generating a signal on one of two lines. If the code resulting from the translation is greater than the code in the status store the signal G will be generated and if the converse is true the signal D will be generated. The signal G is applied to the detector 27 which alters the assigned status code one bit when other selected signals are also applied to the detector concurrently. The signal D is used to activate the arithmetic unit 34 which decrements the timing code for line LO1 during the LSO*n* state when S=O.

The signal on line S1, in addition to being applied to the translator 21, is also applied to detectors 25 and 26. A 1 output from the former detector is used to activate the arithmetic unit 34 in the timing unit 8 when the assigned status of line LO1 is the OT state and S1 = 1 (FIG. 4B). Additionally, the output of the detector 25 is also applied to NAND gate 32 along with the timing signal TO. Thus, during the OT state, when the signal on line LO1 drops making S1 = 0, the output of detector 25 becomes 0 and this, combined with TO = ), enables gate 32. When the gate 32 is enabled, the timing code for line LO1 is decremented on each sample of the line until the signal TO = 1 is generated representing the OT to IDLEO state transition shown in FIG. 4B.

Activation of the arithmetic unit 34 by the output of the OT detector 25 results in the LO1 line timing code being incremented during the OT state (FIG. 4B). The output of the detector 26 is used to change the IDLEO code "000" in the status store 11 to the LSO1 code "001" as indicated in FIG. 4B.

The operation of the components shown in FIG. 2 is most easily explained by using the case assumed in the discussion of FIG. 1. That is, the case where line LO1 has been idle for past samples and on the current sample of the line the signal level on it has become and remains sufficient to generate signals on all of the lines S1 through S6. Additionally, it is assumed that the assigned status of line LE1 remains the idle state IDLEE (FIG. 4C). As was noted above, the assigned status of line LO1 at the time of sampling will be the IDLEO state (FIG. 4B) and there will be a 1 on the line S1 (FIG. 2).

At the time of this sampling, the condition S1 = 1 and the existence of the IDLEO code "000" as the output of the status store 11 (FIG. 2) result in a signal being generated by the OT detector 25. None of the other detectors 26 through 28 will be enabled by this combination of signals. The output of the detector 25 is connected as an input to the arithmetic unit 34. The 1 signal generated by the detector 25 enables the arithmetic unit 42 causing it to increment the contents of the location allocated to line LO1 in the odd timing store 8' by one.

The line LO1 location in the timing store 8', which contained a selected base reference value prior to being incremented, no longer contains this reference value. For purposes of explanation this base reference value is assumed to be the five-bit code "00000" and its existence is represented by the timing signal TO. Consequently, this sampling of the line LO1 results in its stored timing code being altered so that the code value is no longer the value that results in the generation of the signal TO. Referring to FIG. 4B, this condition results in the assigned status of the line becoming the OT status which is an active state for purposes of activating echo suppression.

Recalling that the assigned status of the line LE1 is the IDLEE state (FIG. 4C) represented by the code "00" at this time, it is clear that the requirements of equation are satisfied. That is, line LE1 is idle and line LO1 has the assigned active status OT (FIG. 4B). Consequently, echo suppression is activated. Referring to FIG. 3, this is accomplished by the simultaneous application of the "00" (FIG. 4C) code available form the even status store 10 to NAND gate 74 and the "000," available form the odd status store 11 (FIG. 2), along with the condition TO 0 to NAND gate 73. The result is a generation of a 1 by gates 73 and 74. The 1 output of gate 73, in turn enables OR gate 75. Consequently, both inputs to AND gate 76 are 1 resulting in a 1 being applied to the address matrix 17.

As described above, the application of this signal to the address matrix 17 results in the impedance 18 (FIG. 1) being switched in series with the line LE1 whose address is contained in the line address generator 15 (FIG. 3). Echo suppression will remain activated until either the line LO1 becomes inactive again or until the line LE1 becomes active.

If on some later sample of line LO1, during the OT (FIG. 4B) state, the signal level on the line is insufficient to produce a 1 signal on line S1 (FIG. 2), the detector 25 will not generate a 1 output. When this occurs the arithmetic unit decrements the line LO1 timing code stored in the store 8'. This decrementing is accomplished by enabling the NAND gate 32 when both the detector 25 output and the signal TO are 0. The 1 output of the gate 32 enables the OR gate 33 which in turn enables the arithmetic unit 34.

Each sample of the line LO1 which fails to generate a 1 on the line S1 will result in the above result until the line LO1 timing code has been decremented to the value "00000." When this occurs, the timing compare will generate the signal TO = 1 which disables gate 32 and prevents further decrementing of the timing code. At this point, the OT to IDLEO (FIG. 2B) state transition, resulting from the line LO1 becoming inactive, has taken place and the lines assigned status is agaln the IDLEO state. Additionally, TO becoming a 1 also disables NAND gate 73 (FIG. 3) and this results in echo suppression being disabled in accordance with equation (1). This condition will continue to exist until the signal level on line LO1 again becomes sufficient to generate a 1 on line S1.

However, since it has been assumed that the line LO1 remains active for purposes of this discussion, succeeding samples of the line will continue to result in the OT detector 25 (FIG. 2) generating a 1 output signal. This signal along with the existence of the "000" contained in the status store 11 location assigned to line LO1 will result in the line LO1 timing code in the timing store 8′ being incremented every sample of the line. When the LO1 timing code has been incremented until it equals a selected value, the next sampling of line LO1 will result in the generation of a timing signal T1 (FIG. 4B) by the timing compare 35. The timing compare 35 may be any kind of matrix or logic circuitry that responds to the application of selected bit configurations.

On this sample of line LO1, the signal T1 (FIG. 4B), the 1 signal on line S1 (FIG. 2), and the "000" assigned status of the line are applied to the LSO detector 26 simultaneously. This combination of signals results in an output signal being generated by the LSO1 detector 26 which is applied to the odd write logic 29 (FIG. 2). The odd write logic 29, responding to this signal, changes the assigned status code of line LO1 from "000" (FIG. 4B) to "001." This change in assigned state is the change represented in going from the OT state (FIG. 4B) to the LSO1 state. In other words, when the line LO1 has an assigned status of OT and the signal level on it produces a signal on line S1 every time it was sampled for a selected interval, the timing signal T1 is generated. The resulting combination of signals enables the LSO1 detector which changes the assigned status of the line to the LSO1 status (FIG. 4B).

The signal generated by the LSO1 detector 26 is also applied to the odd timing code clear logic 31 (FIG. 2). This input signal enables the logic 31 which generates signals that clear the location in the odd timing store 8′ allocated to line LO1. Thus, when the assigned status of line LO1 is changed from OT to LSO1 (FIG. 4B), its timing code is restored to the selected base reference value 00000."

As succeeding samples of line LO1 result in the continuous generation of signals on all of the lines S1 through S6 (FIG. 2), the lines assigned status will be altered as indicated in FIG. 4B. This is accomplished by enabling the detector 27 every time the line LO1 is sampled until its assigned status becomes the LS06 status.

More specifically, on the next sample after the line is assigned the LSO1 status (FIG. 4B), the resulting digitized values on lines 51 through 56 are translated into the code being used by the translator 21 (FIG. 2). Since it has been assumed that the level on the line remains sufficient to generate signals on all of the lines S1 through S6, the resulting output of the translator 21 will be the code "110." This code is applied to the comparator 22 where it is compared with the "001" status code assigned to line LO1 which is available in the status store 11 at this time. Since the code output of the translator 21 is greater than the assigned status code, the comparator 22 will generate the signal G indicating this relation.

The signal G is applied as one input to the detector 27 (FIG. 2). The other input to this detector is derived from the NAND gate 30 which generates a 1 signal when neither the IDLEO nor the OT states are the assigned status of the line LO1. The function of the gate 30 is to insure that the detector 27 is not enabled during either of these states. As a result of both of its inputs being 1, the detector 27 generates a signal which is applied to the write logic 29 (FIG. 2). This signal results in the assigned status code in the LO1 slot of the status store 11 being incremented by one. This incremented code value is then stored in the line LO1 slot and represents the new assigned status of the line. In this case, the "001" (FIG. 4B) in the line LO1 slot of the store 11 (FIG. 2) is incremented and the resulting "010" is stored back in the slot. In other words, the first enabling of the detector 27 results in the assigned status of line LO1 being changed from the LSO1 state (FIG. 4B) to the LSO2 state.

On the next sample of line LO1, its assigned status will be changed from LSO2 (FIG. 4B) to LSO3 in the same manner as described above. This will continue until the assigned status of the line LO1 becomes the LSO6 state which is represented by the code "110" (FIG. 4B). When the line is sampled and its assigned status code "110" is compared with the "110" resulting from the translation of the digitized level values, the comparator 22 will not generate the signal G (FIG. 2). That is, since the two codes are equal, the comparator 22 will not generate the signal G which indicates that the code output of the translator 21 is greater than the assigned status code.

The absence of the signal G ensures that the detector 27 will not be enabled. Consequently, the line LO1 assigned status code cannot be incremented beyond the value "110" (FIG. 4B). As long as the signal on the line LO1 is of sufficient amplitude to generate digitized level signals on all of the lines S1 through S6 on every sample of the line LO1, its assigned status code will remain the "110" code.

During the active states LSO1 through LSO6, gate 73 (FIG. 2) is not activated. However, each of these state codes contains at least one 1 and this keeps OR gate 75 enabled. Consequently, during any one of the states, echo suppression remains activated as long as the assigned status of the line LE1 remains IDLEE (FIG. 4C).

The operation of the system (FIG. 2) in returning the assigned status of the line LO1 to the IDLEO state (FIG. 4B) is most easily understood if it is assumed that, while the line's assigned status is the LSO6 state, the signal level on it drops, and remains at a level insufficient to generate any digitized level signals on lines S1 through S6 (FIG. 2). The system operation for this case is very similar to the above-described operation of increasing the assigned status code.

On the first sample of the line LO1, after the signal level on it has dropped, no digitized signal levels will be present on the lines S1 through S6. As a result, the output of the translator 21 (FIG. 2) will be the code "000" which is compared with the line's assigned status code "110" (FIG. 4B) available in the status store 11 (FIG. 2). The comparator 22 generates the signal D which indicates that the translator 21 output code is less than the assigned status code. The signal D is applied as an input to the arithmetic unit 34 of the timing unit 8 via OR gate 33.

At this point, the input to the detector 28 from the NAND gate 30 is a 1 indicating that the assigned status of line LO1 is neither IDLEO nor OT (FIG. 4B). However, it will be recalled that the line LO1 location in the timing store was initialized when the LSO1 status was assigned to the line and the timing unit has not been activated since that time. Consequently, the second input T2 required to enable the detector 28 will not be present and the detector will not be enabled for this sample of line LO1. The T2 signal shown in FIG. 2 is the same signal as the T2 in FIG. 4B.

The generation of the signal D results in the contents of the timing store 8′ location allocated for the line LO1 being gated into the arithmetic unit 34 and decremented by one on this sample of the line. As the sampling of the line continues, its timing code in the timing store 8′ will continue to be decremented. After the passage of a selected interval, the timing code will become a selected value and this value will result in the timing compare 35 generating the timing signal T2 (FIG. 4B).

When the timing signal T2 is generated, the output of the NAND gate 30 is a 1 and is present as an input to the detector 28. Consequently, the detector 28 is enabled, generating a signal that is applied to the write logic 29. The application of this signal results in the "110" code (FIG. 4B) contained in the odd status store 11 (FIG. 2) slot allocated to the line LO1 being decremented by one. In other words, the assigned status code of the line is changed from "110" to 101" (FIG. 4B). Simultaneously, the output of detector 28 activates the odd timing clear logic 31 which replaces the T2 code in the line LO1 slot of the timing store 8′ with the base value "00000"

The above has shown how the system changes the assigned status of the line LO1 from LSO6 to LSO5 when the signal level on the line becomes insufficient to generate a digitized level signal of the line S6. The system operates in accordance with the requirements for such a change in status shown in FIG. 4B.

The changing of the assigned status of the line from LSO5 (FIG. 4B), through the various other statuses, to IDLEO is accomplished in the same way as described for the LSO6 to LSO5 change. These changes will occur sequentially at intervals represented by the generation of T2.

At the time the assigned status code of the line LO1 becomes "000" (FIG. 4B), the output of the detector 28 also results in the line's timing code location in the timing store 8' (FIG. 2) being cleared by activating the odd timing code clear logic 31. This represents the LSO1 to IDLEO transition shown in FIG. 4B.

Once the assigned status of line LO1 becomes the IDLEO state (FIG. 4B) represented by the "000" code, the detector 28 cannot be activated. That is, since future samplings of the line LO1 will result in the output of the translator 21 being "000" and the assigned status code it is compared with is "000," the signal D will not be generated by the comparator 22. Hence, the assigned status of the line will remain "000" until the signal level on it rises again.

The condition TO = 1 results in the NAND gate 73 (FIG. 3) being inhibited which in turn results in the AND gate 76 being inhibited. As a result, there is no signal output from the suppression signal logic and the signal R (FIG. 1) generated by the matrix 17, will be applied to the gate 19 switching the impedance 18 out of the transmission path of line LE1. In other words, echo suppression is deactivated since line LO1 being idle indicates that it is not needed.

The preceding has shown in detail how the system in FIG. 2 operates to assign various states to the line LO1 in accordance with the state diagram in FIG. 4B when the signal level on the line rises and decreases while the line LE1 remains idle. Additionally, it has shown that the activation and deactivation of echo suppression is accomplished in accordance with the requirements of equation (1).

The detailed operation of the system in FIG. 1 in assigning various statuses to line LE1 is most easily understood by referring to FIG. 3. In connection with the explanation of FIG. 3, it will be assumed, as was done above, that the line LE1 has the IDLEE state (FIG. 4C) assigned to it and the signal level on it rises and remains at a level sufficient to produce digitized level signals on all of the lines S'1 through S'7 (FIG. 3). After a selected interval, it is assumed the signal level on the line drops to a level insufficient to generate any digitized level signals. This discussion will show in detail how the system operates in varying the assigned status of the line LE1 from the IDLEE state through the various other states in FIG. 4C, and then reassigns the IDLEE state when the line becomes and remains idle for a selected interval.

On the first sample of the line LE1, with the increased signal level on it, digitized level signals will be generated on each of the lines S'1 through S'7 (FIG. 3). These lines are connected as one set of inputs to the level comparator 5 (FIG. 3). At this same time, the line LO1 is sampled and the resulting digitized level signals on lines S1 through S6 are applied as a second set of inputs to the level comparator 5. Since the signal level on line LE1 is sufficient to generate a digitized level signal on the line S'7, it is treated as being greater than the signal level on the line LO1. It will be recalled that this is the criterion for determining whether or not the line LE1 is active. Consequently, the comparator 5 will generate the signal AE (FIG. 3) on this sample of the line pair LE1-LO1.

The active signal AE is applied to the detectors 53, 54 and 56 (FIG. 3). At the same time AE is applied to these detectors, the assigned status code of line LE1 is available from the even status store 10. The simultaneous existence of the IDLEE code and the signal AE results in the DHO detector 53 being enabled. The output of the DHO detector 53 is applied to the write logic 77 resulting in the contents of the store 10 location allocated to line LE1 being incremented by one. For this case, the IDLEE code "00" (FIG. 4C) is changed to "01." In other words, the generation of the signal AE results in the assigned status of line LE1 being changed from the IDLEE state (FIG. 4C) to the active deferred hangover state DHO.

As a result of the assigned state of the line LE1 becoming the active DHO state, represented digitally as "01," the NAND gate 74 (FIG. 3) is disabled. This in turn ensures that echo suppression is not activated since the AND gate 76, which generates the suppression signal, cannot be enabled while gate 74 is disabled.

At the same time the assigned status of the line LE1 is changed the timing unit 7 is activated. This is accomplished by the simultaneous application of the 1 in bit position $\underline{b_1}$ of the DHO (FIG. 4C) code and the AE signal to AND gate 57. This gate is enabled and results in OR gate 61 being enabled. When the gate 61 is enabled, the arithmetic unit increments the line LE1 timing code contained in the timing store 7' by one. This incrementing will continue as the sampling of the LE1-LO1 line pair continues to result in the generation of the signal AE.

However, if the signal level on the line LE1 decreases and samples fail to generate the signal AE, before the LE1 timing code reaches a value resulting in the generation of the timing signal T'1 (FIG. 4C), the aritmetic unit will begin to decrement the stored code. This is accomplished by enabling gate 59 (FIG. 3) when, during the DHO state, a sample of the line pair fails to generate the signal AE. Enabling gate 59 results in OR gate 62 being enable. When gate 62 is enabled, the arithmetic unit 64 decrements the line LE1 timing code contained in the timing store 7' by one. If the signal level on line LE1 remains insufficient to generate the signal AE for a selected interval, the line LE1 timing code will be decremented to a value which, when applied to the timing compare 65, results in the generation of the timing signal T'0 (FIG. 4C).

The generation of the timing signal T'0 in conjunction with the existence of the DHO state and $\overline{AE}$ results in the IDLEE detector 51 being enabled. Enabling this detector results in the assigned status code "01" (FIG. 4C) contained in the status core 10 (FIG. 3) being decremented by one. consequently, the assigned status of the line LE1 is changed from the active DHO state (FIG. 4C) back to the idle state IDLEE.

The change from the IDLEE state to the DHO state and back to the IDLEE state would occur where a burst of noise resulted in the initial indication that line LE1 was active. When the IDLEE state is reassigned to the line LE1, the NAND gate 74 will be enabled and echo suppression may be activated if the status currently assigned to line LO1 is an active status.

On the other hand, if the signal level on line LE1 remains high enough to continuously generate the signal AE every sample of the line for a selected interval while its assigned state is DHO, the line's timing code will be incremented to a value that results in the timing compare 65 generating the timing signal T'1. As mentioned above, this incrementing is accomplished by the enabling of gate 57 in response to the simultaneous existence of DHO and AE.

When the condition AE DHO T'1 occurs, the assigned status of the line will be changed from DHO to E (FIG. 4C). As has been mentioned in the preceding discussion of FIG. 4C, this assignment of the E state indicates that the signal on the line is, in all probability, an information bearing signal.

Referring to FIG. 3, the generation of the timing signal T'1 during the DHO state results in the E detector 54 being enabled. The output of this detector 54 is applied to the write logic 77 which in turn increments the DHO code "01" by one and stores the sum back in the status store 10 location allocated for the line LE1. When this operation is completed, the assigned status code of the line is 10" indicating that its assigned status is E (FIG. 4C).

Additionally, the signal generated by the E detector 54 is simultaneously applied to the even timing code clear logic 63 which clears the contents of the timing store 7' location allocated for the line LE1. Consequently, the assigned status of the line is, at this point, the E state and its assigned timing code storage location has been cleared to a base reference value of "00000." The timing unit 7 is not enabled during the E state and the line's timing code will not be altered from its base reference value.

The assigned status of the line LE1 will remain the active E state (FIG. C) as long as the signal AE is generated by the comparator 5 (FIG. 3) every sample of the LE1-LO1 line pair. However, if the signal level on the line LE1 drops below that on line LO1, resulting in the signal AE not being generated for a sample of the line, the assigned status of the line changes from the E state to the hangover state EH (FIG. 4C).

Referring to FIG. 3, the existence of E (FIG. 4C) and $\overline{AE}$ = 1 at the time line LE1 is sampled enables the EH detector 55 whose output results in the E status code assigned to the line being incremented by one. The output of the detector 55 is applied to the write logic 77 which increments the "10" (FIG. 4C) in the status store 10 location allocated to the line LE1 making it "11."

Figure 5:
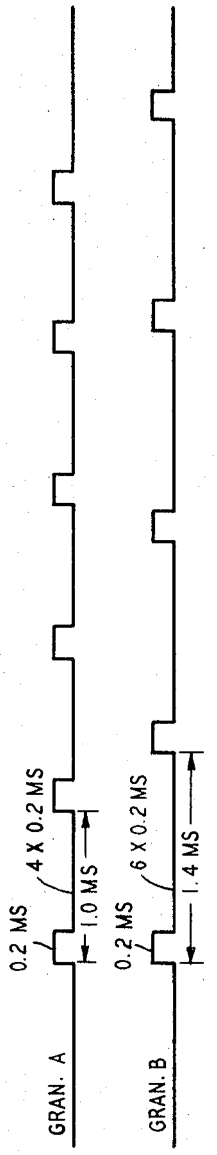
FIG. 5, showing examples of the granularity waveforms, is useful in the detailed description of the invention.

Simultaneously, the signals $\overline{AE}$ = 1 and 11" are also applied to the three-input AND gate 60 (FIG. 3). The third input to gate 60 is the granularity signal B. FIG. 5 shows the granularity signal B having a pulse rate equal to one-seventh the system sampling rate which for purposes of illustration is chosen to be 0.2 milliseconds. The purpose of the granularity signal B is to allow the enabling of the timing unit only after the line has been sampled a selected number of times. In other words, where the granularity B signal occurs only every 7th sample of the line, the line's timing code will be incremented only every 7th sample. The signal B is derived by applying the output of the system clock 16 (FIG. 3) which determines the scanning rate, to a frequency divider 14.

The purpose of using the granularity signal is to allow the five-bit timing store locations to be used for timing long timing intervals without exceeding the location's storage capacity. That is, by incrementing the five-bit timing code only every 7th sample of the line, an interval can be times that is seven times as long as the interval that could be timed if the code were incremented every sample. The granularity signal pulse rate used with a particular state, like the rest of the system timing, is also based on the amplitude statistics of the signals being transmitted and received.

The simultaneous existence of the granularity signal B, the EH state and the $\overline{AE}$ signal enable the AND gate 60. The output of gate 60 enables the arithmetic 64 unit via OR gate 62 and the cleared timing store 68 location with the line LE1 is decremented by one.

Where the decrease in signal level on the line LE1 is only temporary and samples of the LE1-LO1 line pair begin to generate the signal AE before the timing code results in the timing compare 65 (FIG. 3) generating the timing signal T'2, the arithmetic unit will begin to increment the stored timing code. In other words, if the samples of the line pair result in the generation of the signal AE before the expiration of the EH hangover period (FIG. 4C), the arithmetic operations being performed on the stored timing code will be reversed. This is accomplished by enabling gate 58 when, during the EH state, the signal AE and the granularity signal A exist simultaneously. The purpose of the granularity signal A is the same as that described above in discussing the granularity signal B. Here, the granularity will generally be such that the timing code is incremented more frequently than where the signal B is used. An example of the signal A having a pulse rate of one-fifth the scanning rate is shown in FIG. 5.

As the samples of the line pair continue to generate the signal AE, the timing code for the line LE1 will be incremented at a rate which is one-fifth the scanning rate. When the timing code reaches a selected value, the timing compare 65 (FIG. 3) will generate the timing signal T'0 (FIG. 4C).

The simultaneous existence of EH (FIG. 4C), the signal AE and the timing signal T'0 enable the detector 56 (FIG. 3). The output of this detector 56 is applied to the write logic 77 resulting in the "11" EH code in the line LE1 slot of the status store 10 being decremented by one. Additionally, the timing store 7' slot containing the lines LE1 timing code now contains the value "00000" represented by T'0. Consequently, the line's assigned status has been changed back to the E state (FIG. 4C) and its allotted timing store location cleared as a result of the signal level on it rising. The above discussion represents a case where there is a temporary null in the information signals being transmitted over the line LE1.

For the case where the signal level on line LE1 is sufficient to generate the signal AE for an interval represented by the generation of the timing signal T'2 (FIG. 4C), while the line's assigned status is EH, the IDLEE replaces EH as the line's assigned status. This would be a case where the line LE1 was being used to transmit information signals and the transmission is completed. As was discussed above, during the time the assigned status of the line is EH and no AE signal is generated, the line EL1 timing code is decremented at a rate that is some submultiple, equal to 1/B, of the sampling rate. When this timing code has been decremented to the point it equals a selected value, the timing compare 65 (FIG. 3) generates the timing signal T'2 (FIG. 4C).

The simultaneous existence of EH = 1, $\overline{AE}$ = 1 and T'2 = 1 (FIG. 4C) enables the detector 52. The output of this detector 52 is applied to the write logic 77 and results in the slot in the even status store 10, allocated for line LE1 being cleared to "00" (FIG. 4C). Additionally, the output of the detector 52 is connected to the even timing code clear logic 63 which clears the line LE1 slot in the timing store 7'. Upon completion of these operations, the assigned status of the line LE1 is IDLEE (FIG. 4C) and its stored timing code is the base reference value "00000." The reassignment of the idle status to the line LE1 allows the suppression signal logic 12 (FIG. 3) to be enabled and echo suppression activated if the assigned status of the line LO1 is active.

SUMMARY

The foregoing has shown how common time-shared digital circuitry may be used to provide echo suppression in a signal-controlled transmission system. The system is such that when a pair of lines is sampled and information is being received on the receiving line while, at the same time, no information is being transmitted on the transmitting line, echo suppression is activated by inserting an impedance in series with the transmitting path. Under any other conditions, echo suppression is deactivated.

The determination of whether or not the receiving line is active is made by combining the signal level on the line with a statistically determined receive line status code representing past signal levels on the line. The determination of whether or not the transmit line is active is determined by first comparing the signal level on it with the signal level on the receiving line. If the former is greater than the latter, the transmitting line is assumed to be active. The duration of the transmitting line's active state is determined by combining the signals resulting from the comparison of signal levels on the associated line pair with a statistically determined transmit line status code which is a function of past signal levels on the transmit line. The status code assigned to both the receive and transmit lines are altered as a function of the signal levels on these lines at the time of each sampling of the pair. Additionally, at the time of sampling, the assigned status codes of the line pair are combined to control the activation or deactivation of echo suppression.

Echo suppression is activated when the receive line has an active assigned status and the assigned status of the transmit line is the idle status. Any other combination of assigned status codes results in echo suppression being deactivated, if activated at that time, or being maintained inactive if it is not activated.

While the foregoing has dealt, in detail, with only one line pair and the system operation during the time slots for this pair, it is obvious that the system operation is the same for each of a plurality of line pairs during their respective time slots. Discussing a single line pair fully discloses applicant's method and the operation of the system utilized to perform the method while eliminating the redundancy inherent in a discussion involving a plurality of line pairs.

Additionally, it is clear that the system stores, shown as separate entities, could just as well be a single storage unit. Separate stores were used in the illustrative embodiment merely to facilitate describing the system's operation.

Clearly, upon reading the foregoing disclosure, numerous other applications and adaptations, all within the scope and spirit of the invention, will become apparent to one skilled in the art.

I claim:

1. In combination:

means for comparing the signal level on a first line with a selected set of digital code signals to determine which of a plurality of digital activity status codes is to be assigned to indicate the current activity status of said first line;

means for simultaneously comparing said signal level on said first line with the signal level on a second line to determine if said second line is idle; and means for generating a control signal in response to signals indicating that said first line's current assigned activity status is an active status, and said second line is idle.

2. The combination of claim 1 further comprising:

means responsive to said control signal for activating echo suppression.

3. In combination:

means for translating analogue signal levels on a first line into a first set of digital level signals;

means for simultaneously translating analogue signal levels on a second line into a second set of digital level signals;

a first combining means for combining said first set of digital level signals with a first set of selected code signals to determine the current activity status of said first line;

a comparison means for comparing said first set of digital level signals with said second set of digital level signals to determine which of the two lines is carrying the highest signal level;

a second combining means for combining the output signal of said comparison means with a second set of selected code signals to determine the current activity status of said second line; and means for generating a selected control signal in response to the existence of selected combinations of said first and said second line current activity statuses.

4. The combination of claim 3 further comprising:

a gating means;

an impedance means; and means responsive to said selected control signal for enabling said gating means, to insert said impedance means in series with the transmission path over said second line.

5. In a signal controlled communications system, having a plurality of receive-transmit line pairs, the combination comprising:

means for converting the analogue signal level on a selected receiving line into a first set of digital level signals;

means for converting the analogue signal level on an associated transmitting line into a second set of digital level signals;

common time-shared means for statistically translating said first set of digital level signals into one of a first plurality of activating status codes;

common time-shared means for statistically translating said second set of digital level signals into one of a second plurality of activity status codes; and common time-shared means responsive to selected combinations of said first and said second activity status codes for generating a control signal.

6. In a signal controlled communications system having a plurality of receive-transmit line pairs, the combination comprising:

means for repetitively sampling each pair of said plurality of line pairs at a selected rate;

means for converting the analogue signal level on the sampled receive line into a set of digital level signals;

a common time-shared state detector for statistically translating said set of digital level signals into a selected activity status code; and common time-shared means for generating a selected control signal in response to the simultaneous application of said selected activity status code and selected signals which are a function of the analogue signal level on the transmit line sampled concurrently with said receive line.

7. The combination of claim 6 further comprising:

a common time-shared storage means for storing said activity status code; and a common time-shared timing means for generating selected timing signals upon the expiration of selected intervals, said timing means being responsive to selected output signals of said state detector.

8. The combination of claim 7 wherein said state detector is responsive to selected combinations of sets of digital level signals representing selected signal levels on said receive line, selected ones of said timing signals, and selected activity status codes.

9. In a signal controlled communications system having a plurality of receive-transmit line pairs, the combination comprising:

means for repetitively sampling each pair of said plurality of line pairs at a selected rate;

means for converting the analogue signal level on the sampled transmit line into a set of digital level signals;

means for converting said set of digital level signals into a line activity signal;

a common time-shared state detector for statistically translating said line activity signal into a selected one of a plurality of activity status codes; and common time-shared means for generating a selected control signal in response to the simultaneous application of the selected activity status code and selected signals which are a function of the analogue signal level on the receive line sampled concurrently with said transmit line.

10. The combination of claim 9 further comprising:

a common time-shared storage means for storing said activity status code; and a common time-shared timing means for generating selected timing signals upon the expiration of selected intervals, said timing means being responsive to selected output signals of said state detector.

11. The combination of claim 10 wherein said state detector is responsive to said line activity signal, selected ones of said timing signals, and selected activity status codes.

12. The combination of claim 10 further comprising:

a source of enabling signals having pulse recurrent frequencies equal to various submultiples of the line sampling rate, which signals are applied as inputs to said timing means; and said timing means being responsive to the simultaneous application of selected output signals of said state detector and selected ones of said enabling signals.

13. A combination for providing echo suppression in a signal-controlled communications system having a plurality of odd-even line pairs which comprises:

means for repetitively sampling the analogue signal level on both the odd and the even line of each line pair comprising said plurality of line pairs simultaneously at a selected rate;

means for converting said signal level on said odd line to a set of digital level signals;

means for converting said signal level on said even line to a set of digital level signals;

common time-shared comparison means for comparing the sets of digital level signals which comparison means generates an active signal if said signal level on said even line is greater than said signal level on said odd line;

a common time-shared odd state detector for translating said set of digital level signals derived from said odd line into an odd activity status code;

a common time-shared even state detector for translating said active signal into a selected even activity status code;

common time-shared means responsive to said odd activity status code and selected even activity status code for generating a control signal; and common time-shared means responsive to said control signal for activating echo suppression.

14. A machine method comprising the steps of:

1. combining the signal level on a first line with selected digital code signals to determine said first line's assigned activity status;

2. comparing the signal level on a second line with said signal level on said first line to determine if said second line is idle; and

3. generating a control signal when said assigned activity status of said first line is an active status and said second line is idle.

15. The machine method of claim 14 wherein step 4 further comprises the steps of:

4. translating said signal level on said first line into a plurality of digital level signals;

5. combining said digital level signals with a set of stored digital signals representing the past assigned activity status of said first line; and

6. altering said set of stored digital signals in a selected manner for selected combinations of said set of stored digital signals and said digital level signals.

16. The machine method of claim 15 wherein step 5 comprises:

combining said digital level signals with a stored digital activity status code, and selected timing signals.

17. A machine method comprising the steps of:

1. comparing signal levels on a first line with signal levels on a second line;

2. generating an active signal, indicating information is being transmitted on said second line, when the comparison of step 1 indicates said signal level on said second line is greater than said signal level on said first line;

3. combining said active signal with selected stored code signals to statistically determine said second line's assigned activity status.

18. The machine method of claim 17 further comprising the step of:

4. deactivating echo suppression upon the occurrence of said active signal generated in step 2.

19. The machine method of claim 17 wherein step 3 further comprises:

5. combining said active signal with a set of stored digital signals representing the past assigned activity status of said second line; and

6. altering said set of stored digital signals in a selected manner in response to the occurrence of selected combinations of said set of stored digital signals existing concurrently with said active signal.

20. The machine method of claim 19 wherein step 5 comprises combining said active signal, a stored activity code, and selected timing signals.

21. A method of digital echo suppression comprising the steps of:

1. translating the analogue signal level on a first line into a first set of digital level signals;

2. translating the analogue signal level on a second line into a second set of digital level signals;

3. translating said first set of digital level signals into a selected set of code signals;

4. comparing said selected set of code signals with a set of stored code signals representing the past assigned activity status of said first line to determine said first line's current activity status;

5. comparing said first set of digital level signals with said second set of digital level signals to determine if said second line is active; and

6. activating echo suppression when the current activity status, determined in step 4, is an active status, and step 5 indicates said second line is not active.

PO-1050
(5/69)

UNITED STATES PATENT OFFICE
CERTIFICATE OF CORRECTION

Patent No. 3,562,448 Dated February 9, 1971

Inventor(s) Carl J. May, Jr.

It is certified that error appears in the above-identified patent and that said Letters Patent are hereby corrected as shown below:

Claim 15, line 1, after the word "step", change the number "4" to --1--.

Signed and sealed this 25th day of May 1971.

(SEAL)
Attest:

EDWARD M.FLETCHER,JR.
Attesting Officer

WILLIAM E. SCHUYLER, JI
Commissioner of Patents